(12) United States Patent
Peters

(10) Patent No.: US 7,404,077 B1
(45) Date of Patent: Jul. 22, 2008

(54) EXTENSION OF X.509 CERTIFICATES TO SIMULTANEOUSLY SUPPORT MULTIPLE CRYPTOGRAPHIC ALGORITHMS

(75) Inventor: Mark E. Peters, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/240,265

(22) Filed: Jan. 29, 1999

(51) Int. Cl.
*H04L 9/00* (2006.01)
(52) U.S. Cl. ............... 713/156; 713/170; 713/171; 713/175; 380/30
(58) Field of Classification Search ............ 705/67, 705/75; 713/175, 156, 170, 171, 201; 380/30; 308/30; 726/3, 2
See application file for complete search history.

(56) References Cited

U.S. PATENT DOCUMENTS

| | | | | |
|---|---|---|---|---|
| 5,903,882 A | * | 5/1999 | Asay et al. | 705/44 |
| 5,923,756 A | * | 7/1999 | Shambroom | 713/156 |
| 5,995,625 A | * | 11/1999 | Sudia et al. | 705/51 |
| 6,021,201 A | * | 2/2000 | Bakhle et al. | 713/189 |
| 6,131,120 A | * | 10/2000 | Reid | 709/225 |
| 6,157,721 A | * | 12/2000 | Shear et al. | 380/255 |
| 6,175,626 B1 | * | 1/2001 | Aucsmith et al. | 380/30 |

FOREIGN PATENT DOCUMENTS

GB   2321741   8/1998

JP   07-013486   1/1995

OTHER PUBLICATIONS

CryptWare Toolkit internet references, http://www.software-aus.com.au/utimaco2.htm, http://www.software-aus.com.au/Utimaco6.htm.*
Schneier, Applied Cryptography pp. 480, 481, 574, 575.*
Balenson, "Privacy Enhancement for Internet Electronic Mail: Part III: Algorithms, Modes, and Identifiers," Network Working Group, Request for Comments (RFC) 1423, Feb. 1993, Sec. 4.3.*
Housley et al., Internet SX.509 Public Key Infrastructure Certificate and CRL Profile, Network Working Group, Request for Comments 2459, Jan. 1999.*
"Degitabushomei to Angogizyutu", Piason Edukashon Co., pp. 175-189, Dec. 24, 1997 (not translated).

* cited by examiner

*Primary Examiner*—Emmanuel L Moise
*Assistant Examiner*—Paul Callahan
(74) *Attorney, Agent, or Firm*—Joseph E. Bracken, Esq.; Steven M. Greenberg, Esq.; Carey Rodriguez Greenberg & Paul LLP

(57) ABSTRACT

A technique permitting an X.509 certificate to simultaneously support more than one cryptographic algorithm. An alternative public key and alternative signature are provided as extensions in the body of the certificate. These extensions define a second (or more) cryptographic algorithm which may be utilized to verify the certificate. These are not authenticated by the primary signature and signature algorithm in the primary cryptographic algorithm. These newly defined extensions are reviewed by a receiving entity if the entity does not support the cryptographic algorithm of the primary signature.

4 Claims, 4 Drawing Sheets

EXTENSION OF X.509 CERTIFICATES TO SIMULTANEOUSLY SUPPORT MULTIPLE CRYPTOGRAPHIC ALGORITHMS

BACKGROUND OF THE INVENTION

1. Field of the Invention

The present invention relates to a technique for permitting X.509 certificates to utilize more than a single encryption algorithm. More particularly, the present invention relates to a technique by which a certificate may be extended to support a second encryption algorithm while not requiring a new certificate hierarchy and while maintaining backward compatibility.

2. Description of the Related Art

Security for transactions and documents transmitted over networks such as the Internet have been a stumbling block to having true end-to-end e-commerce. Security flaws in existing systems are well documented, and security which is transparent to the public has been difficult to implement. Thus, many people feel less than secure about sending credit card numbers and the like to merchants via the Internet.

More recently, to address this problem, the companies which produce the VISA and MasterCard credit cards jointly came up with an end-to-end specification for securely transmitting credit card numbers and information as part of electronic transactions over the Internet. This specification, known as SET (Secure Electronic Transactions), was first introduced in 1997 (SET is a trademark of SET Secure Electronic Transaction LLC).

The SET specification relies on the concept of certificates, which are issued to merchants, credit card holders, credit card issuers, etc. Certificates are subject to verification based on their 'signature', and are encrypted. The standard certificate type which is used in known as the X.509 certificate.

One drawback to X.509 certificates is that they support only a single encryption algorithm at a time. Also, some encryption algorithms perform better in some environments. Recent highly publicized events have shown that some encryption algorithms can be broken if enough resources are thrown at them. This is not well received by the public. However, it has been demonstrated that most unscrupulous parties have only limited resources. And if the effort to decrypt a certificate outweighs the potential reward, no attempt will be made to break the encryption. In this regard, SET certificates are somewhat vulnerable. The certificates support only a single encryption algorithm, and most certificates use only a single, known standard algorithm. So, while it is not easy, a party bent on decrypting a certificate can intercept a certificate on the Internet and have a pretty good idea of which algorithm is employed. By employing the extensive resources required to decrypt the certificate, the party can then succeed in decrypting the certificate.

Accordingly, a need exists for making X.509 certificates support additional cryptographic algorithms.

SUMMARY OF THE INVENTION

An object of the present invention is to provide a technique for utilizing more than one encryption algorithm in an X.509 certificate.

Other objects and advantages of the present invention will be set forth in part in the description and the drawings which follow, and, in part, will be obvious from the description or may be learned by practice of the invention.

To achieve the forgoing objects, and in accordance with the purpose of the invention as broadly described herein, the present invention provides an X.509 certificate capable of supporting more than one cryptographic algorithm, comprising a signature algorithm and signature for all authenticated attributes using a first cryptographic algorithm; an alternative public key extension for identifying at least one alternative cryptographic algorithm and providing its associated public key; and an alternative signature extension for containing a signature for the alternative cryptographic algorithm. Preferably, the first cryptographic algorithm is RSA and the alternative cryptographic algorithm is elliptic curve. Also, the certificate can be verified by either the signature for the first cryptographic algorithm or the signature for the alternative signature algorithm.

The present invention will now be described with reference to the following drawings, in which like reference numbers denote the same element throughout.

DESCRIPTION OF THE PREFERRED EMBODIMENT

Figure 1:
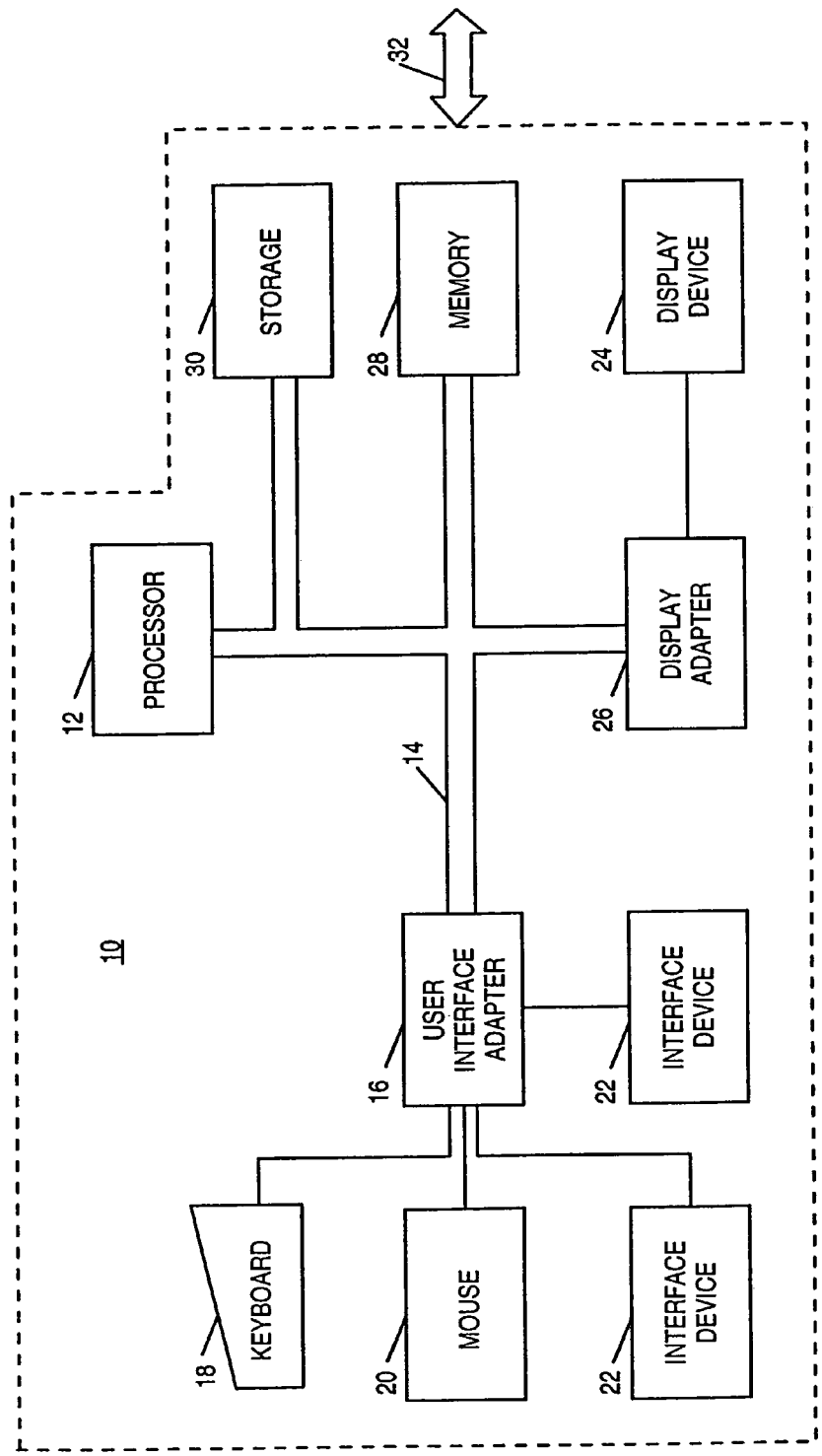
FIG. 1 is a pictorial representation of a data processing system which may be utilized to implement the present invention.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long term storage 30 which can include a hard drive, tape drive, etc.

The workstation 10 communicates via a communications channel 32 with other computers or networks of computers. The workstation 10 may be associated with such other computers in a local area network (LAN) or a wide area network, or the workstation 10 can be client in a client/server arrangement with another computer, etc. All of these configurations, as well as the appropriate communications hardware and software, are known in the art.

Figure 2:
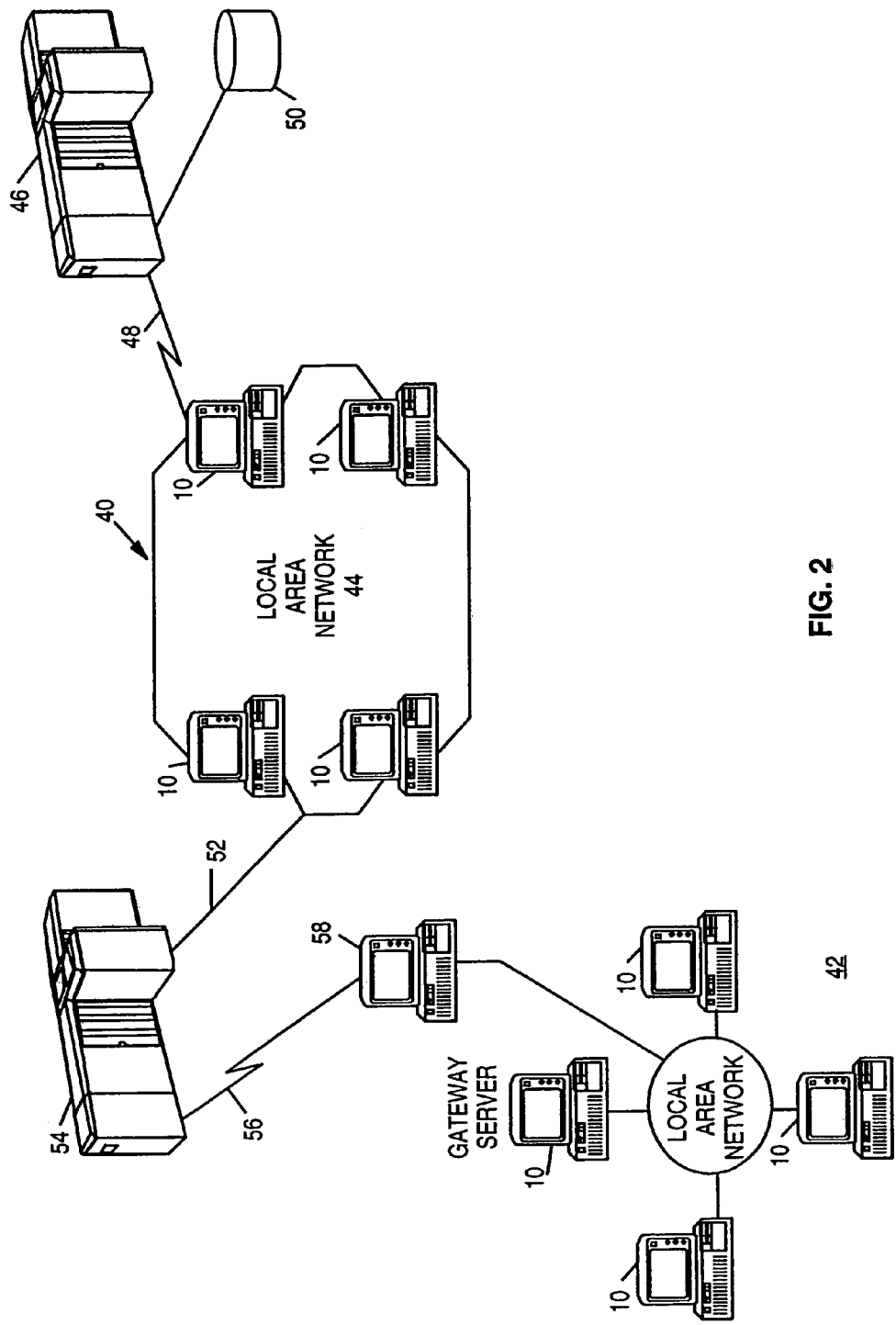
FIG. 2 is a diagram of a networked computing environment in which the present invention may be practiced.

FIG. 2 illustrates a data processing network 40 in which the present invention may be practiced. The data processing network 40 includes a plurality of individual networks, including LANs 42 and 44, each of which includes a plurality of individual workstations 10. Alternatively, as those skilled in the art will appreciate, a LAN may comprise a plurality of intelligent workstations coupled to a host processor.

Still referring to FIG. 2, the data processing network 40 may also include multiple mainframe computers, such as a mainframe computer 46, which may be preferably coupled to the LAN 44 by means of a communications link 48. The mainframe computer 46 may be implemented utilizing an Enterprise Systems Architecture/370, or an Enterprise Systems Architecture/390 computer available from the International Business Machines Corporation (IBM). Depending on the application, a midrange computer, such as an Application System/400 (also known as an AS/400) may be employed. "Enterprise Systems Architecture/370" is a trademark of IBM; "Enterprise Systems Architecture/390", "Application System/400" and "AS/400" are registered trademarks of IBM.

The mainframe computer 46 may also be coupled to a storage device 50, which may serve as remote storage for the LAN 44. Similarly, the LAN 44 may be coupled to a communications link 52 through a subsystem control unit/communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention is typically stored in permanent storage of some type, such as the permanent storage 30 of the workstation 10. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

The preferred embodiment of the present invention will now be discussed with reference to FIGS. 3 through 4.

The architecture and features of X.509 certificates are well known and will not be described in detail herein. Basically, the current SET specification utilized RSA public key cryptography as the encryption technique for the X.509 certificates it has defined for use therewith. And standard X.509 only supports having one public key being certified in a certificate. Likewise, a certificate issuer can only sign with one key type. In this scenario, only one algorithm can be supported. If support is desired for a second algorithm, a distinct certificate hierarchy would be required. Maintaining a second hierarchy would be very expensive.

Further, if the current X.509 public key and signature elements were to be changed from a single item to a multiple item format, the new certificates would be incompatible with the old ones.

All extensions in an X.509 certificate are included in the portion of the X.509 certificate referred to as "data to be signed". Elements in the "data to be signed" portion are not encrypted; thus they may be obtained for validation and are protected from modification by the signature.

Figure 3:
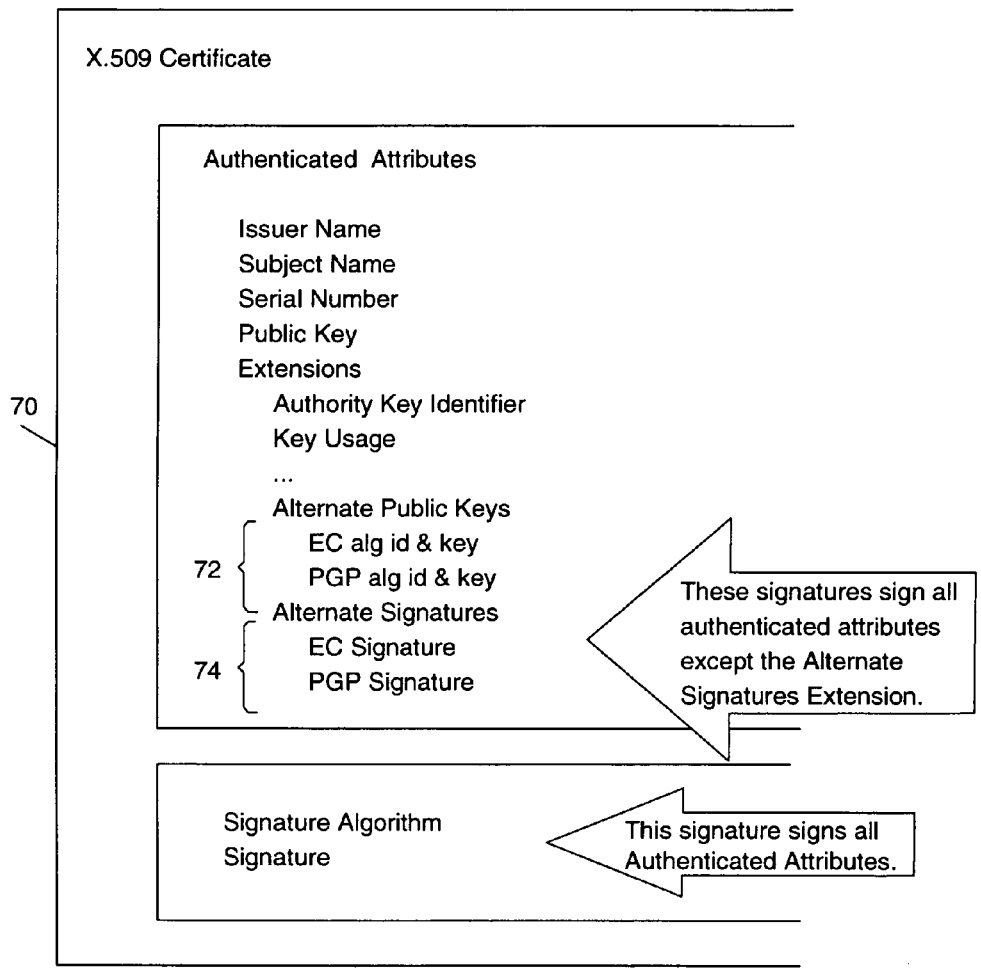
FIG. 3 illustrates a certificate having extensions in accordance with the present invention.

Referring now to FIG. 3, an outline 70 of an extended X.509 certificate according to the present invention is illustrated. The present invention provides two new X.509 extensions 72, 74. The first extension 72 lists the alternate algorithms with the associated public key being certified for that algorithm. The second extension 74 lists alternative signatures for algorithms supported by the issuing certificate authority. When validating the primary or existing signature in a signed X.509 certificate, the certificate is signed over the entire unsigned certificate, including all extensions. When validating the signature of an alternate signature, the signature is validated for the unsigned certificate, except for the extension containing the list of signatures. This allows the important information to be authenticated with any of the signatures, and allows backward compatibility with entities which understand single algorithm certificates only (as long as the primary signature is with the supported algorithm).

Preferably, the alternate signatures extension will be a list of items, with each item containing the signature item algorithm (including key type) and the signature. The public keys of the entity being certified are contained in a list where each item contains the key algorithm type and the key.

To sign the certificates, the certificate authority will start by signing with the alternate algorithm. First, the certificate authority signs the unsigned certificate without the alternate signature extension using all of the desired certificate authority's alternative signature private keys.

Each of the corresponding certificate authority alternative signature public keys must be present in the Certificate authority's issuing certificate in its own alternate signature extension. Each signature is added to the alternate signatures extension. Finally, the entire unsigned certificate (including the alternate signatures extension) is signed using the certificate authority's private key that corresponds to the public key contained in the existing signature portion of the certificate authority's X.509 certificate. Thus, any 'old' entity should be able to use the previous public key cryptographic algorithm in the certificate hierarchy with no modifications.

Using this technique, an first entity which supports only one algorithm, such as RSA cryptography, can validate a message (containing a certificate) from a second entity which supports both RSA and a second algorithm, such as elliptic curve, in its extension. (The certificate authority that signed the second entity's certificate would also support both algorithms.) The first entity would, upon reviewing the certificate from the second entity, find that the certificate contains an RSA public key that is signed by a certificate authority that the first entity trusts. The first entity wold also notice that there is an extension that the first entity does not understand, but that extension is considered non-critical, and can be ignored without repercussion.

A third entity which only supports elliptic curve may also validate a message from the second entity. The third entity would review the certificate from the second entity and understand that the primary algorithm is RSA and that the certificate is signed with RSA. The third entity would review the extensions and determine that the certificate also has an elliptic curve public key and an extension that contains an elliptic curve alternative signature. If the third entity validates the alternative signature and the third entity trusts the issuing certificate authority, the third entity can trust that the elliptic curve key in the certificate is legitimate.

Since the extension is marked as non-critical, entities that do not support the multiple algorithm enhancement could continue to function under the original public key algorithm, without needing to be aware of or modified for the extension. Also, when new root certificates are issued for a protocol or implementation, the new root can add the extensions and the root trust mechanisms (via key or certificate hashes) do not have to be changed. For example, future SET roots can add elliptic curve support by adding these extensions and both the SubjectPublicKeyInfo hash validation and the root horizontal chaining continue to work exactly as before.

Figure 4:
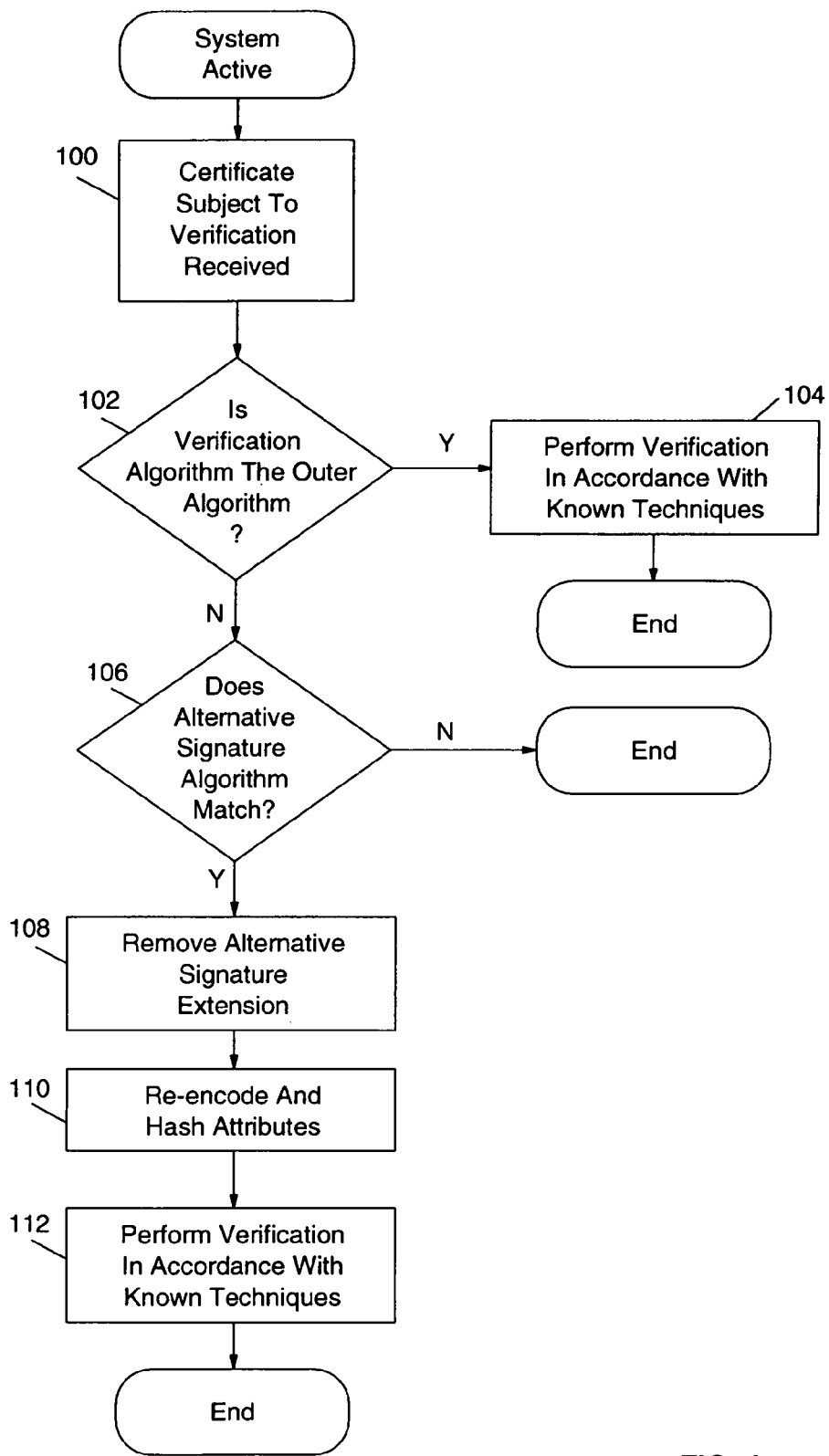
FIG. 4 is a flow chart illustrating the logical steps involved with verifying a certificate having the alternative signature extensions.

FIG. 4 is a flowchart which illustrates the logic associated with verifying an extended X.509 certificate according to the present invention. First, a receiving entity receives a certificate (Step 100). Then, a determination is made as to whether the verification algorithm for the receiving entity is for the outer algorithm, i.e., the signature algorithm for the authenticated attributes (Step 102). If this is determined to be the case, processing of the extension algorithm does not have to occur. Verification and authentication of the certificate is then carried out in accordance with the existing single algorithm technique (Step 102).

If it is determined in Step 102 that the primary signature is not supported by the receiving entity, the alternative signature in the extension is checked for a match (Step 106). If no match occurs here, processing ends, as the certificate cannot be verified. If a match does occur, processing proceeds to Step 108, in which the alternative signature extension is removed from the attributes. The attributes are then re-encoded in accordance with known techniques, and hashed. Verification of the alternative signatures is then performed in accordance with known techniques. Processing then ends.

Although the present invention has been described with respect to a specific preferred embodiment thereof, various changes and modifications may be suggested to one skilled in the art and it is intended that the present invention encompass such changes and modifications as fall within the scope of the appended claims.

The invention claimed is:

1. A method for enabling an X.509 certificate to support more than one cryptographic algorithm, with an associated public key, comprising the steps of:
   providing the X.509 certificate with a signature algorithm with associated public key and signature for all authenticated attributes;
   providing the X.509 certificate with a first certificate extension identifying at least one alternative cryptographic algorithm and providing a respective associated public key; and
   providing the X.509 certificate with a second certificate extension which contains a signature for each alternative cryptographic algorithm, whereby an alternative cryptographic algorithm may be supported without establishing a new certificate hierarchy.

2. The method for enabling an X.509 certificate to support more than one cryptographic algorithm according to claim 1, wherein the first cryptographic algorithm is RSA and the alternative cryptographic algorithm is elliptic curve and the first and second certificate extensions are identified as non-critical.

3. The method for enabling an X.509 certificate to support more than one cryptographic algorithm according to claim 1, wherein the certificate can be verified by either the signature for the first cryptographic algorithm or the signature for the alternative signature algorithm.

4. The method for enabling an X.509 certificate to support more than one cryptographic algorithm according to claim 1, wherein
   the signature for all authenticated attributes includes the signing of the second certificate extension, and
   the signature for each alternative cryptographic algorithm does not include the signing of the second certificate extension.

* * * * *